United States Patent

[11] 3,600,787

[72] Inventor Wesley N. Lindsay
San Jose, Calif.
[21] Appl. No. 827,741
[22] Filed May 26, 1969
Continuation-in-part of Ser. No. 696,951,
Jan. 10, 1968, abandoned, which is a
Continuation of Ser. No. 509,250, Oct. 21,
1965, abandoned, which is a Division of
Ser. No. 326,696, Nov. 29, 1963, abandoned.
[45] Patented Aug. 24, 1971
[73] Assignee International Telephone and Telegraph
Corporation
New York, N.Y.

[54] METHOD OF MAKING CAPACITORS WITH FREE-STANDING ELECTRODES
16 Claims, 24 Drawing Figs.
[52] U.S. Cl. ...................................................... 29/25.41,
29/423, 317/244
[51] Int. Cl. ................................................................ H01g 13/00
[50] Field of Search ........................................... 29/25.41,
25.42, 605, 424, 423; 317/244, 260

[56] References Cited
UNITED STATES PATENTS
3,273,034 9/1964 McGraw ...................... 29/25.42 X
1,219,629 3/1917 Davenport ..................... 29/618
3,519,902 7/1970 Morozovsky ................. 317/244 X Primary Examiner—John F. Campbell
Assistant Examiner—D. M. Heist
Attorneys—Thomas E. Kristofferson, C. Cornell Remsen, Jr., Walter J. Baum, Paul W. Hemminger and Percy P. Lantzy ABSTRACT: The disclosure includes a method of making a vacuum capacitor having parallel, conductive electrodes which can be in the form of plates, discs, cylinders, or meshed spirals. Two spacing layers of dielectric, bonded salt particles, or bonded molybdenum trioxide particles are employed to keep the turns of each plate spaced from each other and from the turns of the other plate. Removable stainless steel strips may also be used in some configurations of electrodes. A braze joint is provided for one edge of one plate to fix the position of the said one plate. A braze joint is similarly provided for an edge of the other plate. Brazing is performed while both plates and both spacing layers are held tightly together. The plates are then further processed to make a vacuum capacitor. It is one outstanding feature of the disclosure that the brazing steps are performed while the spacing layers are left intact. This makes it possible to increase arcing or breakdown voltage, to increase capacitance, and to decrease the size of the capacitor. It is also possible to make a larger diameter capacitor and a longer capacitor of much greater capacitance. It is further possible to make such an improved capacitor at a lower cost.

PATENTED AUG24 1971

Inventor
WESLEY N. LINDSAY
By
Attorney

Inventor
WESLEY N. LINDSAY
By
Attorney

INVENTOR
WESLEY N. LINDSAY
BY
ATTORNEY

INVENTOR
WESLEY N. LINDSAY
BY
ATTORNEY

INVENTOR
WESLEY N. LINDSAY
BY
ATTORNEY 3,600,787

METHOD OF MAKING CAPACITORS WITH FREE-STANDING ELECTRODES

BACKGROUND OF THE INVENTION

This application is a continuation-in-part of my copending application, Ser. No. 696,951 filed on Jan. 10, 1968, now abandoned, for "Sealed Construction for Vacuum and Hermetically Sealed Envelopes for Electronic Components." Application Ser. No. 696,951 is a continuation of my abandoned application, Ser. No. 509,250 of the same title filed on Oct. 21, 1965. Application Ser. No. 509,250 was a division of my abandoned application, Ser. No. 326,696 of the same title filed on Nov. 29, 1963. Therefore, the benefit of all of the filing dates of all of the aforesaid copending and abandoned application is hereby claimed for this application. U.S. Pat. Nos. 3,346,933 issued on Oct. 17, 1967, and 3,377,531 issued on Apr. 9, 1968, contain some disclosure common to this and all of the aforesaid applications. Said common disclosure may also be found in my abandoned application, Ser. No. 540,102 of the same title filed on Apr. 4, 1966.

This invention relates to an economical method of making a capacitor and, more particularly, a method of making a capacitor of a high structural integrity and with a highly uniform and exceptionally accurate plate spacing. The capacitor also has the advantages of high breakdown voltage, high capacitance, and large size variation.

The invention is especially useful in manufacturing vacuum capacitors of the fixed or variable type.

In the past, it has been the practice to make a fixed vacuum capacitor by brazing one end of a set of spaced, concentric, conductive cylinders to a conductive metal plate. A second set of cylinders are similarly brazed to a second plate. The second set of cylinders are then partially inserted or interleaved between the first set, and the structures thereafter sealed in a ceramic envelope after outgassing. None of the cylinders touch one another. Thus, the cylinders act as the fixed, conductive electrodes of a vacuum capacitor.

One outstanding disadvantage of the prior art method is that no matter how precisely the electrodes are spaced prior to brazing or bonding procedures, the high temperatures required inevitably cause slight warping of the electrodes. The spacing between cylinders, thus, is not uniform. This reduces the breakdown voltage of the capacitor and requires a larger spacing than would be required provided the spacing were everywhere uniform. The capacitance per unit volume varies approximately as the inverse square of the electrode spacing. Thus, larger capacitors are required for a given voltage duty when the spacing is not uniform. Further, since the concentric cylinders are normally positioned one against the other by means of a rib at one end of the cylinders, as shown for example in FIG. 1 of U.S. Pat. No. 2,740,926, the concentricity error is cumulative and has limited the maximum number of cylinders. In addition, cylinder length has been limited to about three inches owing to thermal distortion of longer cylinders. The manufacturing cost of the cylinders is also high.

SUMMARY OF THE INVENTION

In accordance with the method of the present invention, the above-described and other disadvantages of the prior art are overcome by holding conductive electrodes with spacing layers between them into tight engagement. The edges of one set of electrodes are then bonded in fixed positions relative to each other while the bundle of electrodes and spacers are pressed one against the other.

In the case of spirally wound strips, the fabrication step of winding both strips and spacers actually performs two functions simultaneously. It forms the capacitor electrodes into a compact overall cylindrical structure; and, at the same time, it very accurately spaces the electrodes. The electrode spacing is accurately maintained during the subsequent bonding or brazing steps. The relief of internal stresses in the metal and warping occasioned by uneven heating or cooling which ordinarily cause a shift in spacing of the electrodes is effectively prevented by the spacing material.

In accordance with the invention, an electrode has substantial stiffness provided it has some curvature in respect to a plane normal to the plate to which the electrodes are bonded so that the rigidity added by bonding an edge thereof in fixed position increases the structural integrity of a bonded electrode throughout its entire extent. Thus, it may be self-supporting or free-standing. Moreover, the electrodes are accurately spaced before, during, and after the bond is made because the spacers are left intact throughout the thermal cycling of the assembly.

The accuracy achieved according to the invention is retained because the electrodes retain their shape by the combination of the bonded edges thereof and the stiffness thereof.

If dielectric spacing layers are employed, the completed capacitor may be constructed leaving the dielectric between the strip turns. However, due to the stiffness of the strips, the spacing layers may also be removed, and a vacuum or other dielectric employed.

The highly accurate plate spacing which is achieved in accordance with the invention makes it possible to construct a capacitor of an extraordinarily high breakdown voltage. No uneven spacing exists. The electrodes are, thus, everywhere uniformly spaced apart a distance to maximize voltage breakdown. The result is that voltage gradients of 1,000 volts per mil, based on the theoretical or design value of spacing, are readily obtained,; whereas in the past, voltage gradients of 500 volts per mil theoretical spacing were difficult to attain.

The high accuracy with which the capacitor electrode spacing may be controlled also makes it possible to use very small spacing between electrodes. A higher capacitance may, thus, be obtained for a capacitor the same size as that of a prior art capacitor. Conversely, it is possible to make a capacitor of the same capacitance and a smaller size. It is also possible to make a larger capacitor with a very large capacitance. The cumulative tolerance error which is attendant upon the use of the prior art conductive cylinders does not exist in the practice of the present invention. The electrodes of the present invention, thus, always accurately mesh for any large overall length or diameter. The cost of accurately making and aligning the electrodes is also much less than that required for making and aligning the cylinders. However, the use of the removable spacer also has been found advantageous to maintain spacing during assembly of capacitors utilizing concentric cylinders, as shown in pending U.S. application, Ser. No. 820,451 filed on Apr. 30, 1969. entitled "Variable Vacuum Capacitor with Optimum Movable Plate Support and Method of Manufacturing Same."

Therefore, it is an object of the invention to provide a method of making an improved, yet inexpensive, vacuum capacitor.

Another object of the invention is to provide a method of making a capacitor of a large capacitance and/or small size.

A further object of the invention is to provide a method of making a capacitor which may be unusually long in length and/or unusually large in diameter.

A still further object of the invention is to provide a method of making a capacitor having a large effective voltage gradient between capacitor electrodes.

Yet another object of the invention is to provide a method of making a relatively strong capacitor having accurately positioned spiral conductive plates.

Another object of the invention is to provide a method of making a strong capacitor having accurately positioned disc-shaped, cone-shaped, or cylindrical-shaped electrodes.

Another object of the invention is the provision of a method of making a vacuum fixed capacitor in which the capacitor electrode assembly comprises a pair of elongated metallic strips mechanically held apart by a pair of woven dielectric strips, the four strips being convolutely wound into a tightly compacted mass in which the entire lengths of the capacitor plates are supported against vibration and shock.

Briefly considered, the convolutely wound, fixed capacitor of the invention comprises a capacitor assembly fabricated from a pair of elongated, conductive metallic strips, conveniently oxygen-free, high conductivity (OFHC) copper or aluminum, between which is sandwiched a first strip of dielectric material such as low-loss woven quartz cloth. A second strip of the same material is superposed on the opposite sides of one of the metal strips so that when the strips are wound, the convolutions will be uniformly spaced by an intervening layer of dielectric. The opposed capacitor plates are wound so that adjacent edges of the opposed plates are laterally offset so that opposite edges of adjacent plates may be conductively brazed to appropriate end plate assemblies. The end plate assemblies are held apart by and hermetically united to a dielectric envelope portion which encloses the convolutely wound capacitor plates. Means are provided within the capacitor to insure against unwinding of the spirally wound capacitor plates.

The above-described and other advantages of the invention will be better understood from the following description when considered in connection with the accompanying drawings.

BRIEF DESCRIPTION OF THE DRAWINGS

In the drawings, which are to be regarded as merely illustrative.

BRIEF DESCRIPTION OF THE PREFERRED EMBODIMENTS

In terms of greater detail, the spiral or convolutely wound, fixed capacitor of the invention comprises a pair of elongated, conductive metallic strips 2 and 3 having their opposed flat surfaces 4 and 6, respectively lying in parallel and held apart by parallel and alternatively arranged strips of woven dielectric material 7, preferably woven from quartz or alumina fibers or threads so as to provide a thickness compatible with the breakdown voltage of the evacuated space between the plates.

Figure 7:
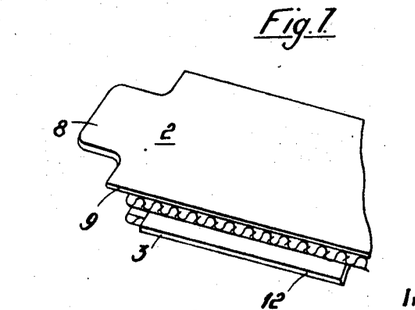
FIG. 7 is a perspective view illustrating the arrangement of dielectric and metallic strips and the end construction of one of the metallic strips which facilitates winding the composite strips into a spiral winding.

As shown best in FIG. 7, the metal strip 2 is preferably provided with a tab portion 8 at one end to facilitate winding of the composite pack of strips and dielectric material on a mandrel. The adjacent longitudinal edges 9 and 12 of the metal strips 2 and 3, respectively, are laterally offset so that the edge 12 of strip 3 projects a short amount beyond the edge 9 of strip 2. Conversely, the longitudinal edge 9 of strip 2 extends laterally beyond the edge 12 of metal strip 3. With this arrangement of the strips, it will be seen that upon winding of the metal and dielectric strips 2, 3, and 7, one set of fixed capacitor plates, constituted by the strip 2, will be offset axially with respect to the other set of plates constituted by the spirally wound strip 3.

Figure 2:
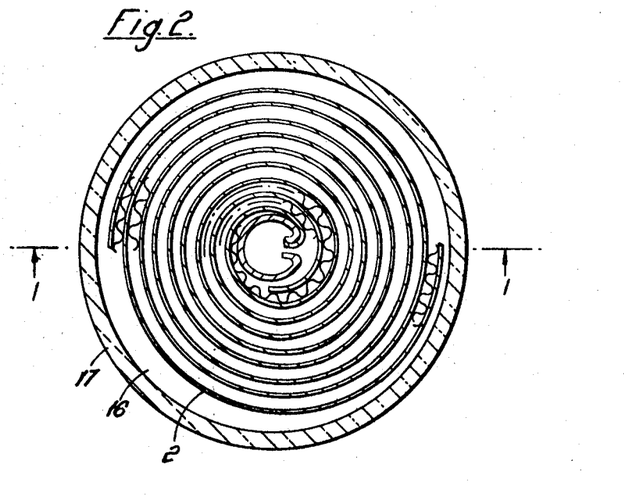
FIG. 2 is a horizontal cross-sectional view of the same capacitor plate assembly after it is inserted in the dielectric envelope portion but before the end plates are brazed thereto.
Figure 3:
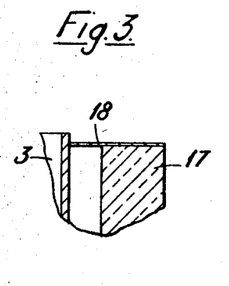
FIG. 3 is a fragmentary sectional view of the assembly of FIG. 1 before the end plates are applied.
Figure 4:
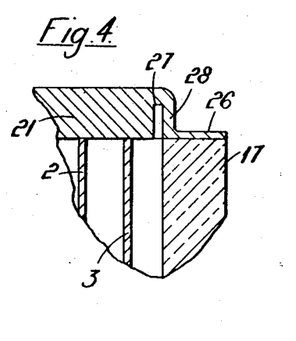
FIG. 4 is a fragmentary sectional view similar to FIG. 3 but showing the assembly after the end plates are brazed.
Figure 5:
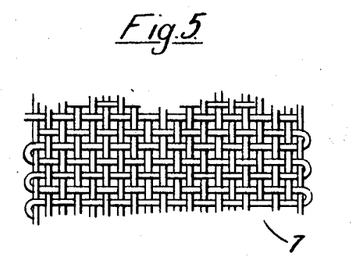
FIG. 5 is a plan view of a short section of woven quartz cloth which is interposed between the plates of the capacitor.
Figure 6:
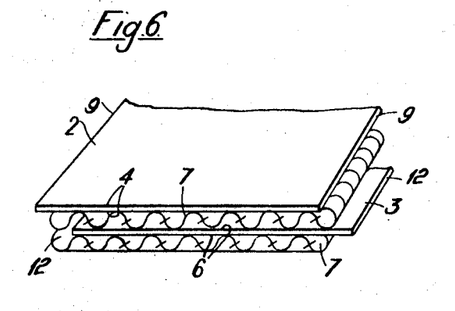
FIG. 6 is an enlarged perspective view illustrating the relationship between opposed capacitor plates and the two strips of dielectric material.

As shown best in FIG. 2, the strips 2 and 3, with the interposed dielectric strips, are preferably wound on a resilient core 13 split, as shown, to provide spaced tabs 14 permitting resilient compression of the core. Upon winding into the configuration illustrated best in FIG. 2, the wound coil is fitted into the inner periphery 16 of a tubular dielectric envelope member 17 having metallized end edges 18. The dielectric member 17 is preferably fabricated from aluminum oxide ($Al_2O_3$) which provides a vacuumtight wall having the requisite dielectric strength.

The central core member 13 is considerably shorter than the width of the strips 2 and 3. Additionally, it will be seen that the strips 2 and 3, as wound, provide an overall coil length somewhat longer than the length of ceramic member 17. It has been found that when the length of the wound metallic and dielectric coil exceeds the length of the ceramic at each end by approximately 0.010 inch, assembly of the unit is greatly facilitated as will hereinafter be explained. After final assembly, the overall width of the composite metallic dielectric strip capacitor plate assembly equals the length of the ceramic member 17. From the foregoing, it will be apparent that with the exterior periphery of the capacitor plate assembly confined within the inner periphery of the dielectric envelope member, the effect of the resilient core member 13 is to keep the various windings of the capacitor, both metallic and dielectric, tightly compressed between the core member and the inner periphery of the dielectric envelope member. Preferably, several turns of woven quartz strip material are wound about the last turn of metal strip to insure that the last turn of metal strip is spaced a small distance from the inner periphery of the envelope. This prevents vibration of the capacitor plates and relative movement between the plates upon impact shocks.

Figure 1:
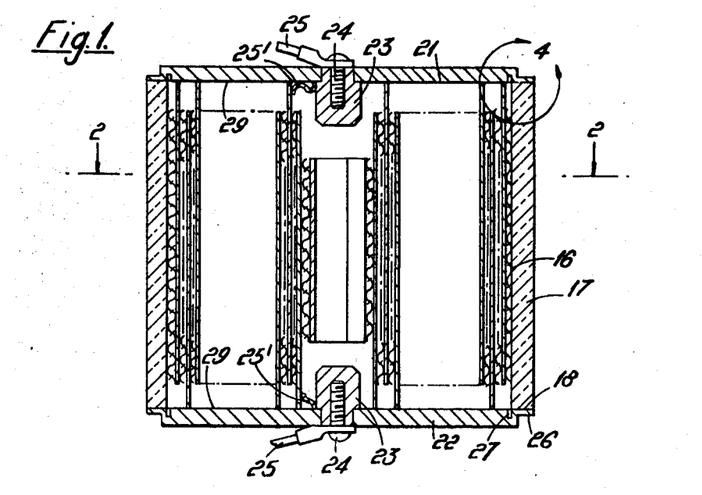
FIG. 1 is a vertical cross-sectional view of a vacuum capacitor taken in the plane indicated by the line 1—1 in FIG. 2.

Closing each opposite end of the dielectric envelope member 17 are annular metallic end plates 21 and 22, shown best in FIG. 1. Each of the plates is preferably formed from oxygen-free, high conductivity (OFHC) copper, or some other suitable metal such as aluminum having high ductility and high electrical conductivity. Centrally disposed within the inner periphery of each plate is a boss 23 extending into the envelope and provided with a threaded bore 24. The bosses are proportioned so as not to interfere with the spiral capacitor plates or the associated ends of the resilient core member 13.

They function to permit connection of the capacitor into a circuit as shown by leads 25. A flexible auxiliary lead 25' which may be considered in effect as extension of lead 25, connects each end plate to the associated capacitor plate 2 or 3 while the end plates are still separated from the associated end of the ceramic envelope portion to permit electrical processing of the capacitor before the envelope is sealed.

In order to accommodate differences in thermal expansion and contraction between the end plates 21 and 22 and the abutting ceramic member 17, the outer peripheral edge portion of each of the end plates is formed in a configuration to provide a compact yet flexible union between these abutting metallic and nonmetallic members. Specifically, each end plate is formed with a rabbet about its outer periphery as shown to provide a radially extending flange 26. The depth of the rabbet is proportioned so as to leave a flange with a thickness of approximately 0.031 inch and a width sufficient to open the radial thickness of the envelope wall. The rabbet and flange 26 will not provide, by themselves, the requisite flexibility in the union of the end plates to the associated ends of the ceramic member 17. To provide the requisite flexibility, each of the end plates is provided with an axially extending peripheral groove 27 spaced radially inwardly from the outer periphery of the end plates an amount to provide a cylindrical flange 28 on each plate having a thickness of approximately 0.031 inch. Thus, it will be seen that with the flanges 26 hermetically brazed to the associated metallized end of a ceramic member 17, differences in expansion and contraction between the metal end plates and the ceramic envelope member will be accommodated by flexure of the cylindrical flange 28. To relieve stresses which might be created by sharp corners, the flange 28 preferably merges smoothly into the end plate as shown. Since this flange is formed of the same high ductility material as the end plates, after brazing, the ceramic member will dominate the metallic flange and prevent rupture of the seal.

Inasmuch as the fixed capacitor hereinbefore described is dependent upon a high vacuum as the electrically insulating medium between opposed plates, the method of assembly to insure an absolutely clean and noncontaminated interior in the envelope is of utmost importance. The invention disclosed herein, thus, includes as a novel aspect the method of assembly hereinafter described. After winding the coil of capacitor plates and dielectric spacer strips and fitting the coil into the ceramic envelope portion as previously described so as to have each set of plates projecting from the associated end of the ceramic a small amount, this subassembly is ready to be united to the end plates.

Prior to final assembly of the end plates on the dielectric envelope member 17, each of the plates is plated on its interior surface 29 with a layer 21 of nickel. The nickel plate performs two functions, one being that it protects the inner surface of each plate against erosion by brazing alloy and secondly, it functions to facilitate wetting of the inner surface 29 of each of the end plates by a braze compound interposed between each such nickel-plated face 29 and the adjacent ends or longitudinal edges of the capacitor plates 2 and 3.

The end plates and ceramic-enclosed coil are positioned within an appropriate vacuum oven structure (not shown) in a manner that the end plates remain spaced a short distance (one-quarter inch is adequate) from the ends of the ceramic. Braze material is, of course, interposed between the end edges of the ceramic and the associated flanges 26 and may be either in sheet or paste form, or prefused to surface 29. Electrical connection is made to each of the plates through leads 25 and 25' as shown. The oven is next evacuated and heated to a temperature at which the braze material becomes molten, but below the rapid vaporization temperature of the braze material. Gases and impurities evolved form the braze material, and other parts of the assembly are removed through the vacuum system which continues to pump during the entire heating cycle. When a satisfactory degree of evacuation is reached, the spaced parts of the assembly are brought into abutting relation, whereupon the molten braze material seals all parts into a composite unit. Of course, the flexible pigtails 25' collapse into the central zone around bosses 23 when the end plates are brought together.

It should be noted at this point that because of the approximately 0.010 inch projection of the plates beyond the ceramic, the inner nickel-plated faces 29 of the end plates engage the ends of the wound capacitor plates before the flanges 26 abut the associated ends of the ceramic. This is important because it insures that the long edge of each plate for its entire length will be embedded in a molten pool of braze material. This type of continuous union between each condenser plate and associated end plate results in each end plate functioning as a heat sink for the condenser plate to which it is united. Such cooperation between these members also aids in drawing heat out of the quartz spacer, thus increasing the power handling capabilities of the capacitor, and functions also to lend rigidity to the condenser plate structure.

It will now be apparent that by charging the plates with potentials of opposite sign through the leads 25 and 25', the capacitor may be electrically processed by the application of high voltages before the envelope is sealed; but after it has been evacuated. Impurities that are driven from the plates are quickly drawn out of the envelope through the approximately one-quarter inch space between the ceramic and flanges 26. Upon completion of the electrical testing, the temperature is raised to melt the braze material; then the end plates are moved toward each other to close the gap, whereupon the braze material hermetically seals the flanges to the ceramic and brazes the spirally wound capacitor plates to the end plates. The capacitor is now complete and may be removed from the oven after cooling for further processing and testing.

From the foregoing, it will be apparent that the dielectric or insulating characteristics of the capacitor are determined by the degree of evacuation of the envelope and not by the dielectric strength of the quartz material interposed between the plates 2 and 3. Because the quartz material constitutes a woven fabric, the ready escape of gases during evacuation is permitted, thus insuring a clean interior. This would not be true if the dielectric material were an impervious sheet of material. It should be noted also that because of the nature of the woven fabric, the individual fibers thereof are subjected to relatively low voltage gradients as a result of their small size. Furthermore, since the fibers lie more-or-less parallel to the capacitor plates, the voltage gradient along the fibers is very low. The low voltage gradient in the dielectric material obtained by this construction will greatly minimize any tendency for heating and degradation of the dielectric. Additionally, it will be obvious that the dielectric material, because it abuts both surfaces of plates 2 and 3, functions to mechanically strengthen the unit and provide a rigid and vibration-free capacitor.

A further advantageous feature of this construction lies in the fact that repeated arc-overs caused by transients and the like do not reduce the high insulation value of the vacuum dielectric. Metal vaporized by arcing immediately condenses on surrounding metal and does not form a continuous and conductive film because of the very large and discontinuous surface of the fibers.

Although cloth woven of fused silica fibers has been repeatedly mentioned in the description above by way of example, other fibrous materials are suitable and even superior to silica in some applications. For example, cloth woven from fused alumina fibers will find application at extremely high frequencies. Likewise, cloth woven from glass fibers of various compositions will be useful for less severe applications, especially at lower frequencies. Felted sheets and sheets made of randomly oriented heat resistant fibers are also useful in the construction of the above-described capacitor and offer the advantage of reduced cost.

Figures 8, 9:
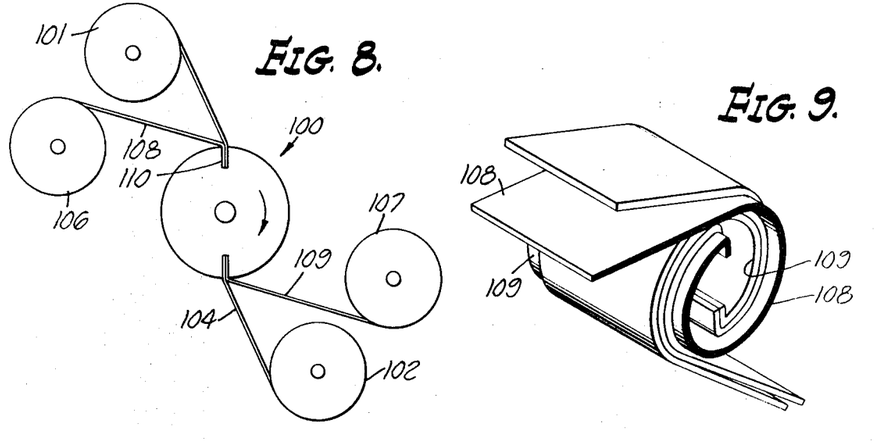
FIG. 8 is a diagrammatic view of apparatus for winding the spiral plates of a capacitor.
FIG. 9 is a perspective view of the spiral plates being wound.

Apparatus for winding the plates of a capacitor in a spiral shape is indicated at 100 in FIG. 8. Apparatus 100 includes spools 101 and 102 of stainless steel. Spools 101 and 102 feed strips 103 and 104, respectively, of stainless steel to a mandrel 105. Strips 103 and 104 may be laminated, if desired. Spools 106 and 107 feed strips 108 and 109, respectively, of copper to mandrel 105. Mandrel 105 has grooves 110 and 111 to accommodate strips 103 and 108 and strips 104 and 109, respectively.

Figure 10:
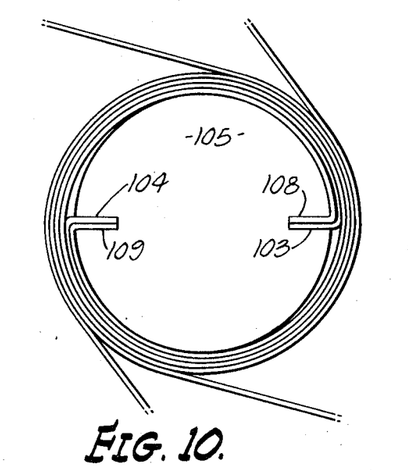
FIG. 10 is an end elevational view of the plates being wound.

All of the strips are wound into a spiral as shown in FIG. 9 and FIG. 10.

Figure 11:
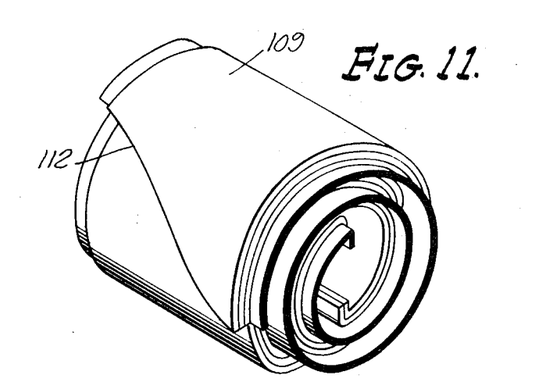
FIG. 11 is a perspective view of the plates completely wound.

Note will be taken that in FIG. 9 that the copper strips are lapped so that the edge of copper strip 109 lies in a plane spaced from the plate in which the edge of copper strip 108 lies. The reverse is true of the opposite end of the spiral. Note that copper strip 109 projects a distance beyond the spiral edge of copper strip 108. In FIG. 11, note will be taken that the end corner of the outside copper strip 109 is cut off at 112 to reduce vibration problems.

Figure 12:
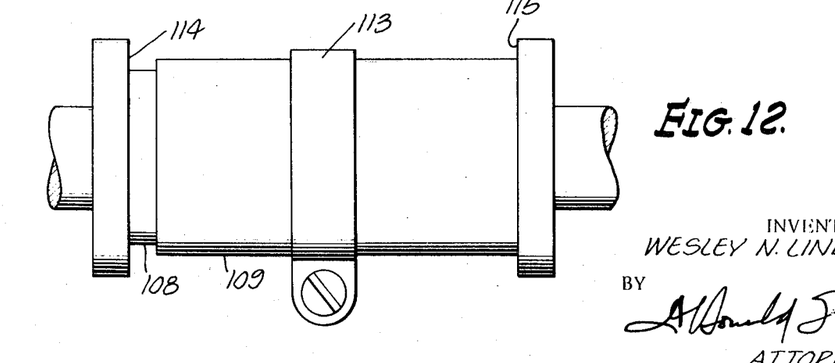
FIG. 12 is a side elevational view showing apparatus for evening the spiral edges of the spiral plates.

After the spiral has been wound with the spacer intact, a clamp 113, which may be identical to a conventional hose clamp, is placed tightly around the spiral as indicated in FIG. 12. At the same time, spirals at 108 and 109 have rigid, flat, parallel plates 114 and 115 pressed against them to align the spiral edges thereof accurately into parallel plane.

Figures 13, 14, 15, 16:
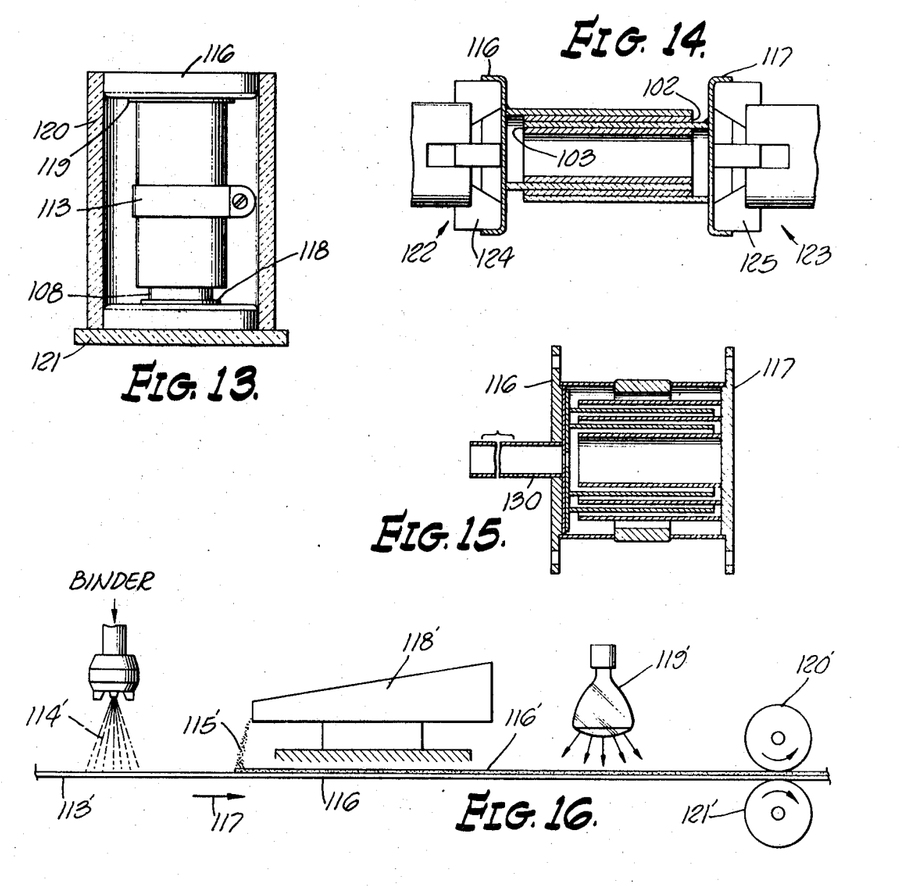
FIG. 13 is a side elevational view, partly in section, illustrating how end plates are brazed to the spiral plates.
FIG. 14 is a longitudinal sectional view showing how the spacers are removed from the spiral.
FIG. 15 is a longitudinal sectional view of a spiral capacitor completely assembled.
FIG. 16 is a diagrammatic view of means for sticking layers of salt to a capacitor plate before it is wound into the spiral shape.

As shown in FIG. 13, end plates 116 and 117 are placed adjacent plates 108 and 109 with discs of solder 118 and 119 between each corresponding capacitor plate. A ceramic cylinder 120 is placed around the assembly to hold the assembly in accurate alignment. The arrangement is placed on a ceramic base 121. The capacitor plates 108 and 109 are thus silver-soldered or brazed to end plates 117 and 116, respectively.

Although clamp 113 holds the spiral tightly together, the stainless steel is not brazed during the brazing operation illustrated in FIG. 13.

The width of the stainless steel strips is indicated at 102 and 103 in FIG. 14. As shown in FIG. 14, end plates 116 and 117 are cup-shaped with the cupped part in each capacitor extending in a direction opposite that of the other.

In FIG. 14, the end plates 116 and 117 are pulled apart by lathe chucks 122 and 123 having inside jaws 124 and 125. The complete capacitor is shown in FIG. 15.

Only a few turns of the spiral capacitor plates are illustrated in FIG. 14 and FIG. 15 for clarity. However, it is an outstanding advantage of the present invention that the number of spiral turns can be increased without limit, and the accurate spacing thereof still maintained due to the way that the spiral edges of the turns are rigidly brazed to the end plates 116 and 117 to hold them in place while, all the time, the stainless steel spacers provide accurate jigging during the brazing operation.

Preferably, the stainless steel and copper strips are rigid, and the rigidity of end plates 116 and 117 increase the rigidity thereof. However, the stainless steel and copper strips must be sufficiently flexible that they can be wound without wrinkling or bending. This requirement may be met by laminating the stainless steel strips. One example is that the stainless steel may include four different, separate strips between each turn of copper. In this case, the stainless steel strips are preferably 0.002 inch in thickness.

A very thin coating of temperature-stable lubricant can be applied to the stainless steel, for example, Teflon or any low volatility hydrocarbon wax may be employed.

The spiral capacitor plates may be bonded to end plates 116 and 117 by any of various methods. For example, a layer of solder may be melted or placed onto end plates 116 and 117 prior to brazing. A thin layer of brazing alloy may also be used. If desired, the stainless steel may be oxidized prior to fabrication. The oxidized surface of the stainless steel will thus not tend to adhere to the brazing compound. After the spacer is made as indicated in FIG. 15, a hole may be provided through one end plate, if desired, and a tubulation fixed thereover as indicated at 130 in FIGS. 15 and 17. After these structures have been provided, the capacitor may be washed, pumped, and otherwise conventionally processed to provide a vacuum capacitor of good operating characteristics.

As is sometimes conventional, the brazing may be performed at the brazing temperature in a reducing atmosphere such as hydrogen. The spacer used in the method illustrated in figs. 8 through 15, inclusive, need not be stainless steel but must withstand the brazing temperature. The thermal expansion coefficient of the spacer and copper should either match, or the spacer be sufficiently deformable as to allow expansion of the copper without undue hindrance. Some other typical spacers might be woven or felted fiberglass or quartz fiber tape or felted refractory fiber, such as mineral wool.

As stated previously, the spacer should not be easily wetted by the brazing compound. Further, it should not adhere to the copper. These requirements should be met at the bonding temperature.

Chromium steels are preferred for the spacer because these steels form chromium oxide which has a nonstick surface.

Steels which have been found highly suitable for spacers are the 18–8 types 302 and 304. The 18–8 steels are approximately 18 percent nickel and 8 percent chromium. Steel types 316 and 347 are also highly desirable. The 400 series steels are desirable and are high chromium stainless steels.

The copper to be used should be oxygen-free, high conductivity (OFHC) copper. As a substitution for the copper spiral plates, silver or aluminum may be used. The invention is thus not limited to any of the examples set forth herein.

Although the method of the present invention is by no means limited to particular copper and spacer thicknesses, the spiral copper sheets are preferably in the range of from 0.005 inch to 0.05 inch in thickness. The spacers are preferably 0.005 to 0.06 inch in thickness.

Note will be taken that in FIG. 8, more than two spiral plates of copper may be wound, if desired. Furthermore, mandrel 105 may have only one of the grooves 110 and 111. Further, mandrel 105 if desired, may have four grooves, one for each of the strips 103, 104, 108, and 109. Note will be taken that hereinbefore and hereinafter many of the steps of the method of the present invention may be performed by hand.

The brazing alloy used is preferably 72 percent silver and 28 percent copper. In the brazing operation, cracked natural or dissociated ammonia gas may be substituted for hydrogen. Note will be taken that the conventional final process of the capacitor of the present invention is a bakeout and pumping operation performed in a vacuum.

In accordance with the method of the present invention, mandrel 105 may be any size. However, the sizes found most easily managed fall within a diameter range of from three-eighths inch to three-quarters inch.

An alternative method of the present invention is illustrated diagrammatically in FIG. 16. A copper strip 113' is sprayed at 114' with 1 and ½percent solution of polymethyl methacrylate in methyl ethyl ketone. This solution causes salt at 115' to adhere to strip 113' as indicated at 116'. Strip 113' is moved in a direction under space 114' as indicated by arrow 117'. Salt 115' is dropped onto strip 113' by a conventional vibrator feeder 118' at a constant rate. Salt 116' is bonded to strip 113' in that a heat lamp 119' dries the methyl ethyl ketone solution.

The laminate is then passed between rollers 120' and 121' which may be used to crush high points of the deposited layer, the salt 116' thereon. The strip 113' with another strip identical thereto is bonded with sized salt and then wound as in FIG. 8 and fabricated identically to the method illustrated in FIGS. 8 through 15, inclusive, except that the step shown in FIG. 14 is omitted. Thus, the capacitor may be made as indicated in FIG. 15, and the salt washed out with distilled water preparatory to the conventional outgassing steps.

It is possible to procure salt crystals on a commercial basis grown in a cubic shape to an accurate size. For example, sodium chloride available as common table salt can be sieved to obtain suitable particles. In such a case, the sizing action of rollers 120' and 121' may be omitted, if desired.

As an alternative to the salt spacer, other spacers may be used which may be removed in any other way. For example, the spacer may be removed by substituting an etching compound that does not attack the copper.

Suitable alternates to the methacrylate binder are a nitrocotten base lacquer or an ash-free adhesive wax applied either molten or dissolved in a volatile liquid.

Sodium chloride melts at 805° centigrade. Thus, when sodium chloride is used as a spacer, the melting temperature of the brazing alloy must be below 805° centigrade. Silver-copper eutectic solder with a melting point of 780° centigrade is eminently suited as the brazing agent.

If desired, the binder which is used between the salt and the copper strip may be such that the binder may be burned out of the capacitor prior to washing. Also, it has been found practical to wash out the binder with an appropriate solvent prior to brazing. Little salt is lost because the particles are held by friction between the spiral metal strips.

It is important to note that, with the use of salt as a spacer, accurate spacing is maintained because the salt may be left intact while all the component parts of the capacitor are bonded together. Both accurate spacing and accurate axial electrode alignment are, thus, maintained at all times. Accurate alignment is achieved because the entire capacitor, as in FIG. 15, is assembled before the salt is washed out.

In washing out the salt, at least the last rinse preferably uses distilled water. The invention will produce a capacitor of superior operating characteristics if more than one rinse is used. However, if it is desired that the salt should be removed, only one thorough rinse need be used.

In a still further embodiment of the invention, molybdenum trioxide particles are employed in lieu of the salt crystals. In this case, the copper strips with molybdenum trioxide particles bonded thereto are wound and fabricated as in the case of the salt crystals, with the exception that the washing step is omitted.

Molybdenum trioxide will sublime at outgassing temperatures and pressures. Therefore, no washing step is needed.

Figure 17:
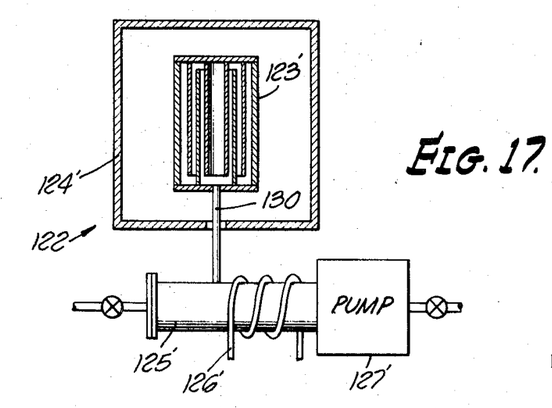
FIG. 17 is a diagrammatic view of apparatus for outgassing a spiral wrapped capacitor.

During outgassing, the apparatus indicated at 122' in FIG. 17 is employed. A capacitor 123' is outgassed, i.e., heated and pumped in a chamber 124'. As the molybdenum trioxide is pumped, it is collected on a tube 125' and cooled by a cooling coil 126'. The molybdenum trioxide, thus, is kept out of a pump 127'.

Nickel chloride may be used in lieu of molybdenum trioxide. However, a disadvantage of nickel chloride is that it deliquesces. That is, it absorbs water much the same as calcium chloride. This property however, can be controlled by working in a low humidity atmosphere or by coating the nickel chloride crystals with a very thin wax of lacquer film to anticipate moisture absorption.

It is also possible to use lead fluoride in lieu of the molybdenum trioxide.

Note will be taken that it is an advantage that the capacitor employing molybdenum trioxide may be fabricated to the point shown in FIG. 15 without removing the molybdenum trioxide. A highly accurate and aligned position of the capacitor plates is, thus, again possible. However, note will be taken that the step of removing the solid spacer illustrated in FIG. 14 may also improve spacing or alignment accuracy.

Molybdenum trioxide melts at 795° centigrade which is sufficiently above the melting point of silver-copper eutectic solder to permit its use while retaining its ability to maintain accurate spacing. Of course, other brazing alloys of lower melting points can be used.

At outgassing temperatures, molybdenum trioxide has a relatively high vapor pressure. At a brazing temperature of say 734° centigrade (above outgassing temperatures), the vapor pressure of molybdenum trioxide is even higher. However, since brazing is done at atmospheric pressure and the molybdenum trioxide is relatively confined by the capacitor structure, very little molybdenum trioxide evaporates under these conditions. When molybdenum trioxide, nickel chloride, and lead fluoride are employed, preferably the braze is made in an atmosphere of nitrogen or argon.

Under high vacuum conditions where the molybdenum trioxide vapor is rapidly removed, the small particles of molybdenum trioxide will sublime without melting at a rate controlled only by the rate of heating of the particles.

Nickel chloride has a melting point of 1,001° centigrade and vapor pressure of ten Torr at 759° centigrade. Lead fluoride melts at 855° centigrade and has a vapor pressure of one Torr at about 770° centigrade. Thus, both are suitable for use as evaporable spacers when used with solders which melt at a temperature near or below that temperature where the evaporation rate would become excessive under atmospheric pressure. A pressure of 10 Torr is not considered to be excessive.

Typical outgassing temperatures are from 850° Fahrenheit to 1,000° Fahrenheit. Bakeout pressure is typically $10^{16}$ Torr.

Note will be taken that although only a fixed capacitor has been described and illustrated, all of the embodiments of the invention are similarly applicable to the manufacture of variable vacuum capacitors or other capacitors.

Figures 18, 19:
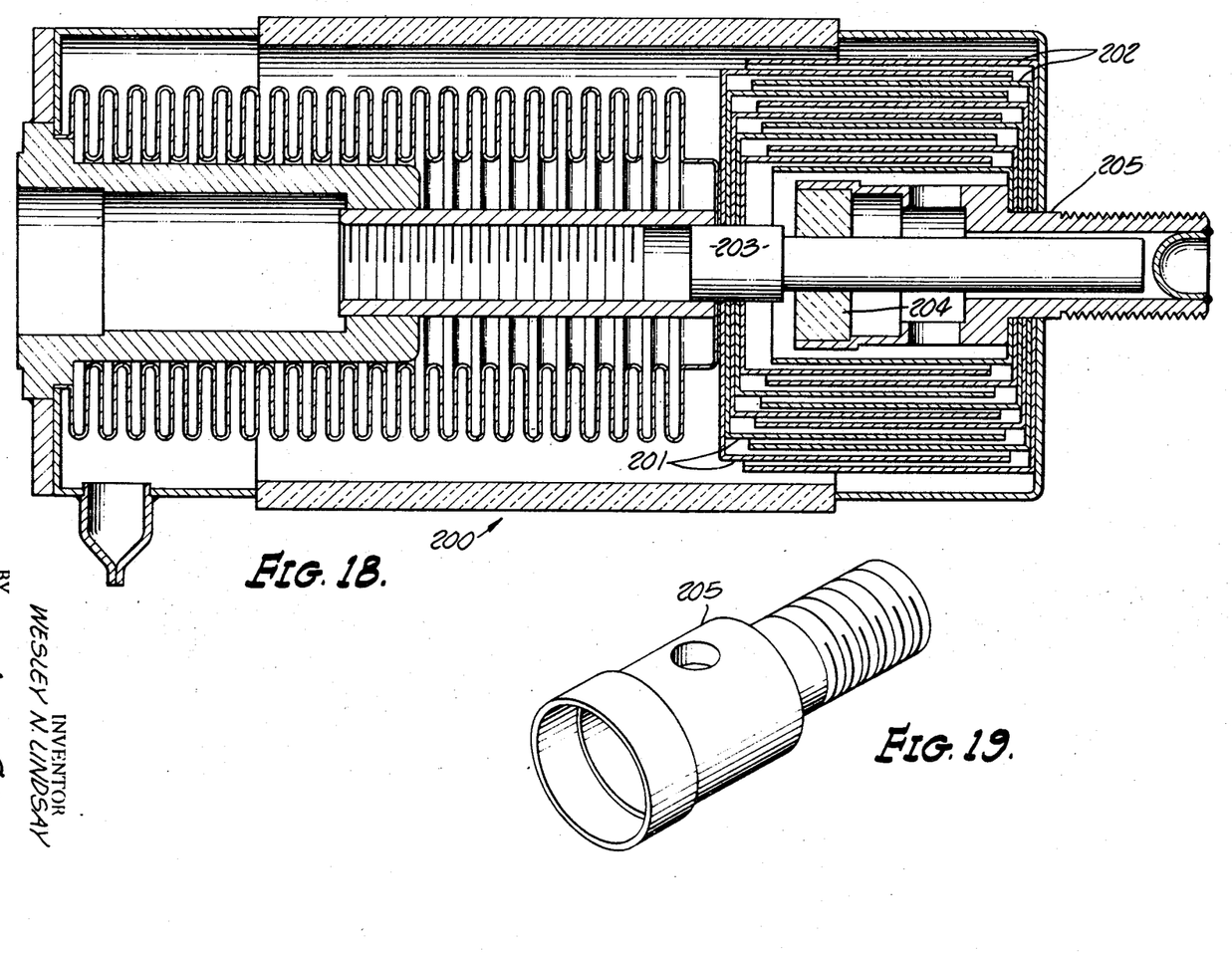
FIG. 18 is a longitudinal sectional view of a variable vacuum capacitor to which the invention is applicable.
FIG. 19 is a perspective view of a component part of the capacitor of FIG. 18.

A variable vacuum capacitor 200 is shown in FIG. 18 having cylindrical, movable electrodes 201 and cylindrical, fixed electrodes 202. Electrodes 201 are fixed to a shaft 203 slidable in an insulating bushing 204. Bushing 204 is fixed inside a fitting 205 shown in both FIGS. 18 and 19.

Capacitor 200 may be made by using spacing strips between electrodes as before. Alternatively, a dissolvable or sublimable spacer may be employed. For example, if sodium chloride is bonded to the exterior surfaces of the cylinders, the cylinders may be telescoped, brazed, and processed as before. If desired, the salt may be sized as before.

Figures 20, 23:
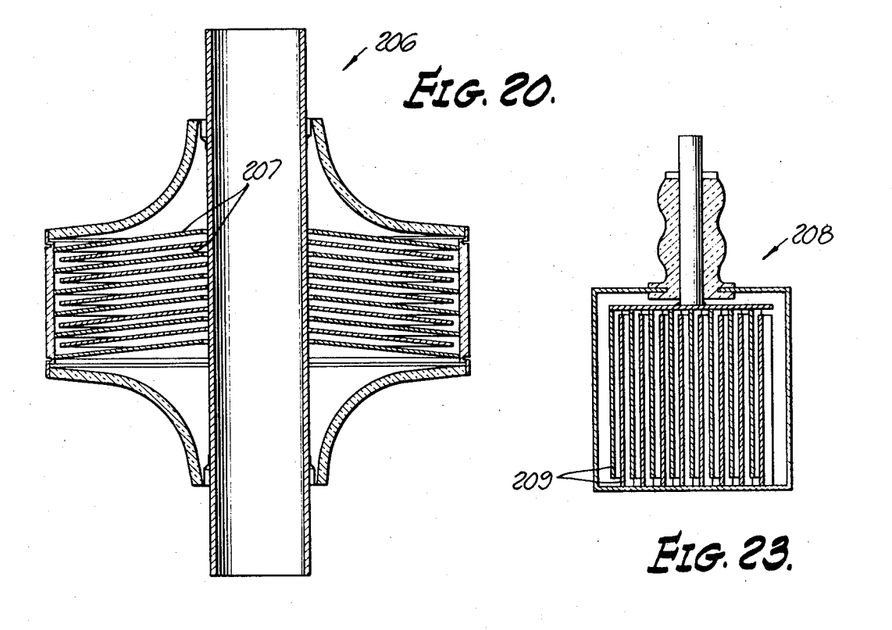
FIG. 20 is a vertical sectional view of a fixed capacitor having conical plates.
FIG. 23 is a vertical sectional view taken on the line 23—23 of the capacitor shown in FIG. 21.
Figure 21:
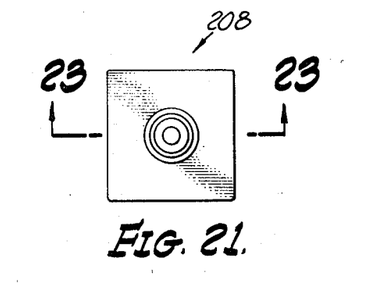
FIG. 21 is a top plan view of another fixed capacitor.
Figure 22:
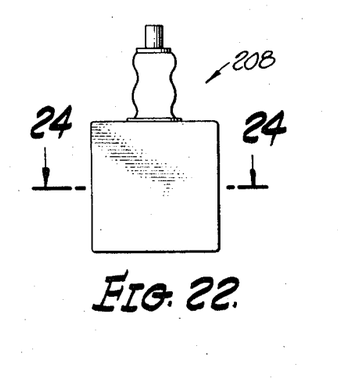
FIG. 22 is a side elevational view of the capacitor shown in FIG. 21.
Figure 24:
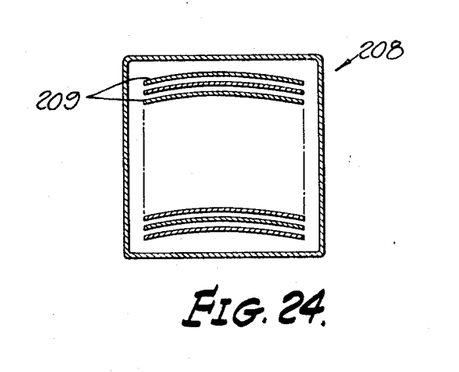
FIG. 24 is a horizontal sectional view taken on the line 24—24 of the capacitor shown in FIG. 22.

A capacitor 206 is shown in FIG. 20 having frustoconical electrodes 207. Capacitor 206 may similarly be made in accordance with the methods disclosed herein. The same is true of a capacitor 208 shown in FIGS. 21 through 24. Capacitor 208 has electrodes 209 which are arcuate in shape as shown in FIG. 24. This shape is employed to give the electrodes 209 stiffness.

What is claimed is:

1. The method of making a capacitor, said method comprising the steps of: winding a four-layer laminate into a tight spiral with the mutually adjacent turns thereof in firm engagement with one another, said laminate including at least first and second conductive layers and a third and fourth spacing layers, said first and second layers having turns disposed on opposite sides of said third layer, said first and second layers also having alternate turns disposed on opposite sides of said fourth layer; and bonding the spirally wound edges of the turns of said first layer at one end of the spiral in fixed positions relative to each other while maintaining all of said layers wound tightly together, the turns of said first conductive layer being of a construction which is made rigid and free-standing.

2. The invention as defined in claim 1, wherein said spacing layers are made of dielectric material.

3. The invention as defined in claim 1, wherein said spacing layers are made of solid strips, said spacing layers being narrower than said conductive layers, said first layer having one edge projecting beyond one edge of said second layer, said second layer having its other edge projecting beyond the other edge of said first layer, said method including the additional steps of bonding the said other edges of the turns of said second layer in fixed positions relative to each other while all of said layers remain wound tightly together, removing said spacing layers, encasing said conductive layers in an envelope, and evacuating said envelope, said bonding step being performed by brazing a rigid conductive plate to said one edge of said first layer and to said other edge of second layer.

4. The invention as defined in claim 1, wherein said spacing layers are made of a sublimable material which has a relatively low evaporation rate at atmospheric pressure and bonding temperatures, and a relatively high evaporation rate at pressures lower than atmospheric and outgassing temperatures, said method including the additional steps of enclosing said bonded layers in an envelope, and evacuating said envelope at a temperature and pressure to cause said spacing layers to sublime, said first conductive layer having its said edge bonded to a structure spanning the gaps between the turns thereof.

5. The invention as defined in claim 1, wherein said spacing layers are made of solid strips, said method including the additional steps of bonding the edges of said second layer at the other end of the turns of the spiral in fixed positions relative to each other while all of said layers remain wound tightly together, removing said spacing layers from inside the turns of said conductive layers, enclosing said conductive layers in an envelope, and outgassing said envelope, said first layer having its said edge bonded to a structure spanning the gaps between the turns thereof.

6. The invention as defined in claim 1, wherein said spacing layers are made of a subliminal material, said method including the additional steps of bonding the edges of said second layer at the other end of the turns of the spiral in fixed positions relative to each other while all of said layers remain wound tightly together, enclosing all of said layers in an envelope, and evacuating said envelope at a pressure and temperature to cause said spacing layers to sublime.

7. The method of making a vacuum capacitor, said method comprising the steps of: fixing one end of first, second, third and fourth layers of solid sheet material to a cylindrical mandrel, said first and second layers being rigid and free-standing and being made of a conductive material; turning said mandrel while maintaining said layers in tension to wrap a tight four-layer spiral on said mandrel, said third and fourth layers having turns in between and separating turns of said first and second layers from themselves and from each other, said third and fourth layers being narrower than said first and second layers, said first and second layers being made of a conductive material, said first layer having one spiral edge projecting beyond said second layer at one end of the spiral, said second layer having one spiral edge projecting beyond said first layer at the other end of the spiral; removing said spiral from said mandrel while keeping all of said layers wrapped tightly in said spiral; pressing the said projecting edges toward each other between two flat plates while maintaining said layers wrapped tightly in said spiral to cause all portions of one of said edges to lie in a first single plane and all portions of the other of said edges to lie in a second single plane parallel to said first plane; brazing a flat, conductive plate to each of said edges while maintaining said layers wrapped tightly in said spiral; removing said third and fourth layers from in between the turns of said first and second layers; brazing a ceramic cylinder between said plates in a position to hold the turns of said first and second layers midway between each other with the unsupported edges thereof spaced from said plates, said first and second layers having the same thickness, said third and fourth layers also having the same thickness, said plates and said cylinder forming an envelope for said first and second layers, said envelope having an opening therethrough, said envelope being hermetically sealed except for said opening; heating and evacuating said envelope simultaneously to provide a vacuum capacitor; and closing off said opening with a hermetic seal while said envelope is evacuated, said third and fourth layers being made of a material which will not decompose or melt at the brazing temperature.

8. The method of making a vacuum capacitor, said method comprising the steps of: depositing a wet lacquer layer on a first conductive strip; dropping particles of molybdenum trioxide on top of said wet lacquer layer; drying said lacquer layer in a manner to cause the same to bond said particles to said first strip; passing said strip with said bonded particles between two rollers to even the thickness of the particles thereon; preparing a second strip identical to said first strip by all of the same steps aforesaid; attaching one end of each strip to a mandrel in a position such that the particles on one strip contact the bare surface on the other strip and vice versa when said mandrel is rotated; rotating said mandrel to wind said strips tightly together in a spiral on said mandrel, said first strip having one spiral edge projecting beyond said second strip at one end of the spiral and said second strip having one spiral edge projecting beyond said first strip at the other end of said spiral; removing said spiral from said mandrel while keeping the turns thereof wrapped tightly together; pressing said edges toward each other between two flat plates to cause all portions of said first strip edge to lie in a first single plane, and to cause all portions of said second strip edge to lie in a second single plane parallel to said first plane; brazing a conductive plate to each said edge; brazing a ceramic cylinder to said plates to form an envelope for said strips, said envelope having an opening thereinto, said envelope being hermetically sealed except for said opening; introducing a solvent into said envelope to dissolve said lacquer; removing said solvent from said envelope; heating and evacuating said envelope simultaneously in a manner to cause said particles to sublime and their vapor to be evacuated; and closing off said opening in a manner to provide a hermetic seal there at while said envelope is evacuated, said brazing step being performed at atmospheric pressure and at a temperature at which the vapor pressure of said molybdenum trioxide is moderately low.

9. The invention as defined in claim 1, wherein said third and fourth layers are sodium chloride crystals bonded to said first and second layers, respectively.

10. The method of making a vacuum capacitor, said method comprising: the steps of: spraying a lacquer on one side of first and second conductive strips; sprinkling sodium chloride crystals onto said lacquer while it is wet; drying said lacquer to cause the same to bond said crystals to said strips; passing said strips in succession between a pair of rollers to size said crystals; winding said strips onto a mandrel to form a tight spiral with said crystals located in between the turns of each strip and in between said strips; removing said spiral from said mandrel; pressing the ends of said spiral between flat, parallel plates to even the spiral edges of said strips, said strips being wound in a manner such that the spiral edge of said first strip projects beyond that of said second strip at one end of the spiral, and the spiral edge of said second strip projects beyond that of said first strip at the other end of the spiral; bonding a flat conductive plate to each said projecting spiral edge while said strips are wrapped tightly in said spiral and at a temperature below the melting point of said crystals; brazing a ceramic cylinder between said plates to form an envelope, said envelope being hermetically sealed except for a small opening thereinto; introducing a solvent into said envelope to dissolve at least a portion of said lacquer; removing said solvent from said envelope; washing said crystals out of said envelope with water; simultaneously heating and evacuating said envelope; and sealing off said opening while said envelope is evacuated.

11. The method of making a capacitor, said method comprising the steps of: placing spacers contiguously between relatively stiff electrodes; and bonding said electrodes in fixed positions relative to each other while said spacers remain between said electrodes.

12. The invention as defined in claim 11, wherein said spacers are solid sheets.

13. The invention as defined in claim 11, wherein said spacers are particles of a liquid-solvable material bonded to said electrodes.

14. The invention as defined in claim 12, including the additional steps of forming a housing around said electrodes fixed relative thereto, and washing said material out from between said electrodes with said liquid.

15. The invention as defined in claim 11, wherein said spacers are particles of sublimable material bonded to said electrodes.

16. The invention as defined in claim 15, including the additional steps of forming a housing around said electrodes fixed relative thereto, heating said material to its sublimation temperature, and pumping gas from inside to the outside of said housing while it is heated.